United States Patent
Moisanen

(10) Patent No.: US 12,452,817 B2
(45) Date of Patent: Oct. 21, 2025

(54) ON INTER-SYSTEM REGISTRATION FAILURE CASE IN MOBILE COMMUNICATIONS

(71) Applicant: MediaTek Singapore Pte. Ltd., Singapore (SG)

(72) Inventor: Matti Moisanen, Oulu (FI)

(73) Assignee: MediaTek Singapore Pte. Ltd., Singapore (SG)

(*) Notice: Subject to any disclaimer, the term of this patent is extended or adjusted under 35 U.S.C. 154(b) by 215 days.

(21) Appl. No.: 17/985,844

(22) Filed: Nov. 12, 2022

(65) Prior Publication Data

US 2023/0180168 A1 Jun. 8, 2023

Related U.S. Application Data

(60) Provisional application No. 63/283,244, filed on Nov. 25, 2021.

(51) Int. Cl.
*H04W 60/00* (2009.01)

(52) U.S. Cl.
CPC ................ *H04W 60/00* (2013.01)

(58) Field of Classification Search
CPC . H04W 60/00; H04W 36/0033; H04W 36/14; H04W 60/04; H04W 88/006; H04W 60/005; H04W 76/10; H04W 76/18; H04W 76/19
See application file for complete search history.

(56) References Cited

U.S. PATENT DOCUMENTS 10,085,161 B1   9/2018   Oroskar et al.
10,880,802 B1   12/2020  Bakker
2020/0267679 A1 8/2020   Kim
2020/0389830 A1 12/2020  Park et al.
2021/0258316 A1 8/2021   Liu

FOREIGN PATENT DOCUMENTS

TW   201924307 A   6/2019

OTHER PUBLICATIONS

ETSI TS 124 501 V16.10.0 (Sep. 2021). 5G; Non-Access-Stratum (NAS) protocol for 5G System (5GS); Stage 3 (3GPP TS 24.501 version 16.10.0 Release 16).*
Taiwan Intellectual Property Office, Office Action in Taiwan Patent Application No. 111145213, Mar. 30, 2023.
European Patent Office, Extended European Search Report in European Patent Application No. 22209577.0, Apr. 5, 2023.
China National Intellectual Property Administration, 1st Office Action in China Application No. 202211494506.3, Apr. 16, 2025.
Nokia et al.: "Initiation of ESFB by a UE in the state 5GMM-REGISTERED.ATTEMPTING-REGISTRATIONI—Update", 3GPP Tsg Ct WG1, 2020-05-26.

* cited by examiner

*Primary Examiner* — Marcus Hammonds
(74) *Attorney, Agent, or Firm* — Andy M. Han; Han IP PLLC

(57) ABSTRACT

Examples pertaining to an improvement on the inter-system registration failure case in mobile communications are described. A user equipment (UE) performs a registration procedure with a wireless network after an inter-system change. In response to detecting a failure of the registration procedure, the UE reattempts the registration procedure. The UE reattempts the registration procedure either: (i) after detecting the failure; or (ii) upon expiry of a first timer used by the UE which has a shorter duration than a second timer used by the UE.

10 Claims, 5 Drawing Sheets

500

PERFORM, BY A PROCESSOR OF A USER EQUIPMENT (UE), A REGISTRATION PROCEDURE WITH A WIRELESS NETWORK AFTER AN INTER-SYSTEM CHANGE

510

DETECT, BY THE PROCESSOR, A FAILURE OF THE REGISTRATION PROCEDURE

520

RESPONSIVE TO THE DETECTING, REATTEMPT, BY THE PROCESSOR, THE REGISTRATION PROCEDURE EITHER:

- AFTER DETECTING THE FAILURE; OR
- UPON EXPIRY OF A FIRST TIMER USED BY THE UE WHICH HAS A SHORTER DURATION THAN A SECOND TIMER USED BY THE UE

ON INTER-SYSTEM REGISTRATION FAILURE CASE IN MOBILE COMMUNICATIONS

CROSS REFERENCE TO RELATED PATENT APPLICATION(S)

The present disclosure is part of a non-provisional application claiming the priority benefit of U.S. Patent Application No. 63/283,244, filed 25 Nov. 2021, the content of which herein being incorporated by reference in its entirety.

TECHNICAL FIELD

The present disclosure is generally related to mobile communications and, more particularly, to an improvement on the inter-system registration failure case in mobile communications.

BACKGROUND

Unless otherwise indicated herein, approaches described in this section are not prior art to the claims listed below and are not admitted as prior art by inclusion in this section.

In wireless communications, including mobile communications in accordance with the 3rd Generation Partnership Project (3GPP) specification(s) such as the 3GPP Technical Specification (TS) 23.502 and TS 23.401, after an inter-system change from an Evolved Packet System (EPS) to a 5th Generation System (5GS) by a user equipment (UE) in an idle mode, the 5th Generation Mobility Management (5GMM) layer is to include an integrity protected TRACKING AREA UPDATE (TAU) REQUEST message in a 5GMM REGISTRATION REQUEST message. The source Mobility Management Entity (MME) in the EPS integrity verifies the TRACKING AREA UPDATE REQUEST during the registration procedure and sends a failure indication to the target Access and Mobility Management Function (AMF) if the verification fails, thereby causing a 5GMM REGISTRATION REJECT message being sent to the UE. If the integrity verification in the MME is successful, the Mobility Management (MM) context is to be transferred to the target AMF and be removed from the source MME. The source MME may keep the MM context for an implementation-specific time after MM context transfer in order to allow the UE to reattempt the procedure in case of a failure. A reattempt may be necessary, for example, if the EPS tracking area updating or 5GMM registration procedure fails abnormally. The context preservation may be controlled by an implementation-specific timer.

If the 5GMM registration procedure fails abnormally, the UE is to reattempt registration after the expiry of timer T3511 (e.g., 10 seconds). However, if the MM context preservation timer in the MME is shorter than timer T3511, the MM context would be removed from the source MME before the new registration attempt. This would result in a failure when the MME is unable to verify the TRACKING AREA UPDATE REQUEST and thus would lead to a 5GMM registration failure. Therefore, there is a need for a solution of an improvement on the inter-system registration failure case in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to an improvement on the inter-system registration failure case in mobile communications. It is believed that the above-described issue would be avoided or otherwise alleviated by implementing one or more of the proposed schemes described herein.

In one aspect, a method may involve a processor of an apparatus (e.g., UE) performing a registration procedure with a wireless network after an inter-system change. The method may also involve the processor detecting a failure of the registration procedure. In response to the detecting, the method may further involve the processor reattempting the registration procedure either: (i) after detecting the failure; or (ii) upon expiry of a first timer used by the UE which has a shorter duration than a second timer used by the UE.

In another aspect, an apparatus may include a transceiver and a processor coupled to the transceiver. The transceiver may be configured to communicate with a wireless network. The processor may perform, via the transceiver, a registration procedure with a wireless network after an inter-system change. The processor may also detect, via the transceiver, a failure of the registration procedure. In response to the detecting, the processor may reattempt, via the transceiver, the registration procedure either: (i) after detecting the failure; or (ii) upon expiry of a first timer used by the UE which has a shorter duration than a second timer used by the UE.

It is noteworthy that, although description provided herein may be in the context of certain radio access technologies, networks and network topologies such as 5G/New Radio (NR) and 4th Generation (4G) EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to an improvement on the inter-system registration failure case in mobile communications. According to the present disclosure, a number of possible solutions may be implemented separately or jointly. That is, although these possible solutions may be described below separately, two or more of these possible solutions may be implemented in one combination or another.

Figure 1:
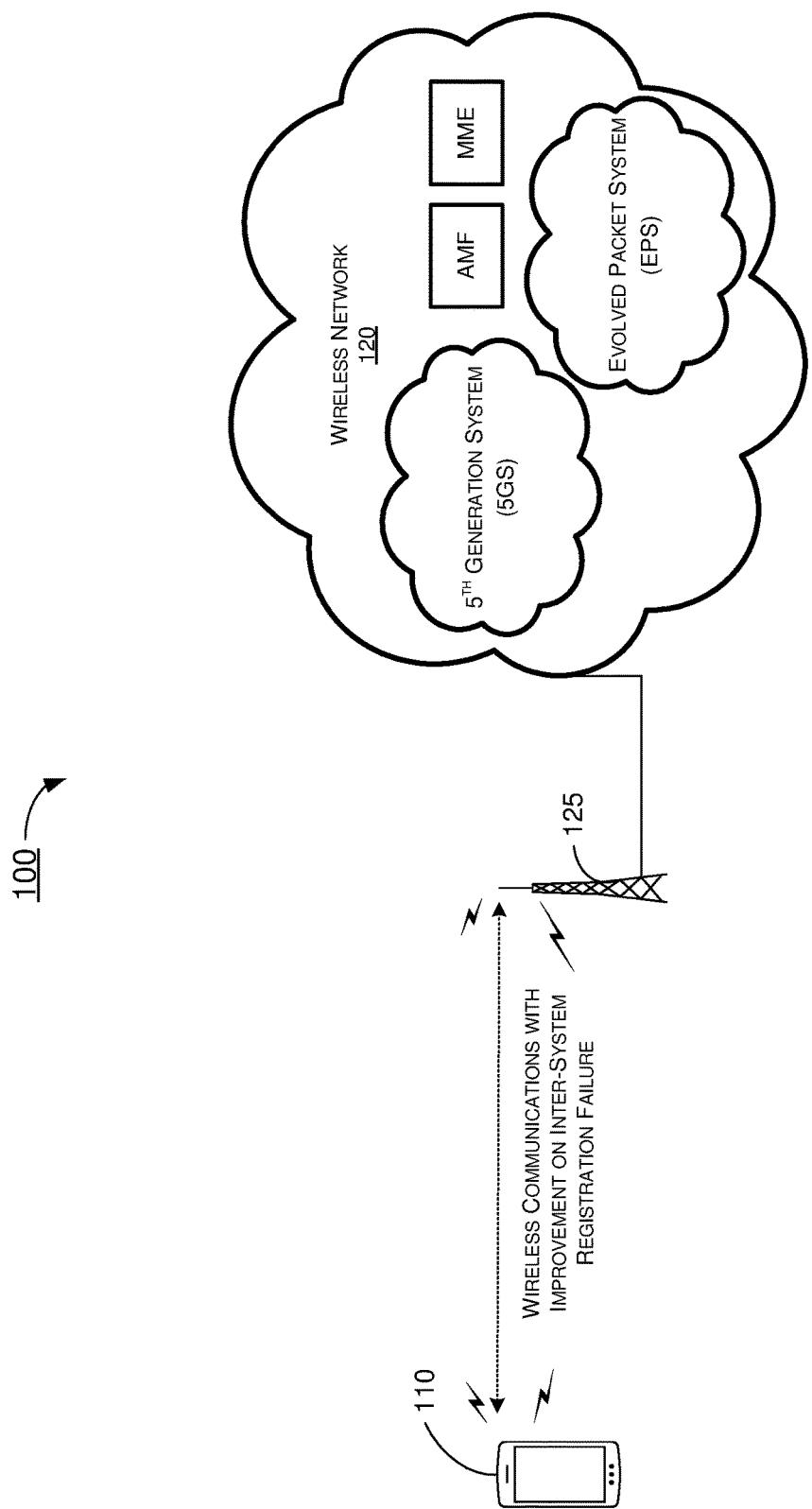
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 5 illustrate examples of implementation of various proposed schemes in network environment 100 in accordance with the present disclosure. The following description of various proposed schemes is provided with reference to FIG. 1~FIG. 5.

Referring to FIG. 1, network environment 100 may involve a UE 110 and a wireless network 120, which may include a 5GS and an EPS. Depending on channel condition, availability and/or other factor(s), UE 110 may be in wireless communication with wireless network 120 via one or more network nodes as represented by a network node 125. Wireless network 120 may also include an AMF and an MME (e.g., as part of 5GS although they are shown separate from the 5GS in FIG. 1). In network environment 100, UE 110 and wireless network 120 may implement various schemes pertaining to an improvement on the inter-system registration failure case in mobile communications in accordance with the present disclosure, as described below. It is noteworthy that, while the various proposed schemes may be individually or separately described below, in actual implementations each of the proposed schemes may be utilized individually or separately. Alternatively, some or all of the proposed schemes may be utilized jointly.

Under a proposed scheme in accordance with the present disclosure, in an event that a 5GMM registration procedure for inter-system change (e.g., from EPS to 5GS) when UE 110 is in an idle mode, UE 110 may have an option to reattempt registration earlier than expiry of timer T3511 before the MM context is removed from the source MME. That is, under the proposed scheme, the MME would still have the MM context when the registration is reattempted by UE 110 so that the TRACKING AREA UPDATE REQUEST integrity verification and the 5GMM registration may be successful. Under the proposed scheme, this may be achieved in one or more ways. For instance, in a first approach, UE 110 may use a timer which is started after detecting the 5GMM abnormal registration failure. In some implementations, the timer may be T3511 timer with a shorter duration. In other implementations, the timer may be a new timer which is of a shorter duration than that of T3511, and this new timer may be used to trigger a new (reattempted) registration procedure.

In a second approach under the proposed scheme, UE 110 may restart the registration procedure immediately after detecting the 5GMM abnormal registration failure. That is, UE 110 may restart the registration procedure without any delay upon detection of the 5GMM abnormal registration failure. In a third approach under the proposed scheme, UE 110 may restart the registration procedure immediately upon release of an NR radio resource control (NRRC) connection after detecting the 5GMM abnormal registration failure. In a fourth approach under the proposed scheme, UE 110 may use a timer, which is started upon release of the NRRC connection after detecting the 5GMM abnormal registration failure, to trigger a new registration procedure.

It is noteworthy that the term "failure" or "abnormal failure" herein may refer to an abnormal failure that occurs despite wireless network 120 successfully validates the TRACKING AREA UPDATE REQUEST from UE 110. Moreover, the term "failure" or "abnormal failure" herein may also refer to an abnormal failure that occurs before UE 110 receives a REGISTRATION ACCEPT message from wireless network 120.

Figure 2:
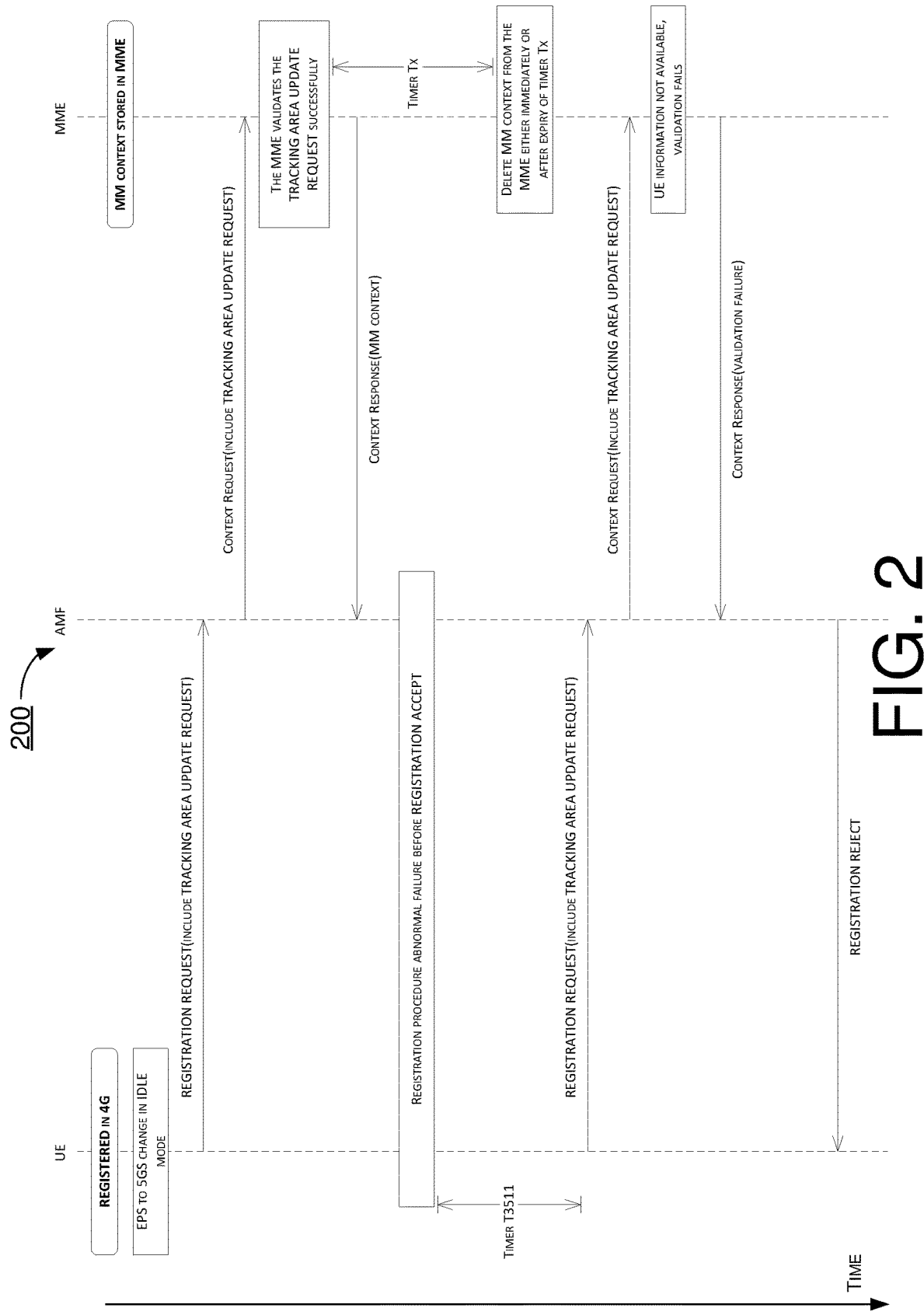
FIG. 2 is a flowchart of an example scenario in which various solutions and schemes in accordance with the present disclosure may be implemented.

For illustrative purposes only and without limiting the scope of the present disclosure, FIG. 2 illustrates an example scenario 200 in which various solutions and schemes in accordance with the present disclosure may be implemented. In scenario 200, initially, a UE (e.g., UE 110) may be registered in a 4G EPS and UE 110 may then change its connection from the 4G EPS to a 5GS. That is, UE 110 may be registered and in an idle mode when connected to the 4G EPS and then chooses to move to a 5GS cell in the idle mode. Then, the UE may initiate a registration procedure by transmitting a REGISTRATION REQUEST message (including a TRACKING AREA UPDATE REQUEST) to an AMF of the wireless network (e.g., via network node 125). The AMF may, in turn, forward a context request (including the TRACKING AREA UPDATE REQUEST) to an MME of the wireless network. The MME may validate the TRACKING AREA UPDATE REQUEST successfully and, in response, send a context response (with an MM context) to the AMF. The MME may delete the MM context either immediately or upon expiry of a timer Tx (which may be started by the MME upon successful validation of the TRACKING AREA UPDATE REQUEST). On the other hand, an abnormal failure in the registration procedure may occur before the UE receives a REGISTRATION ACCEPT message from the AMF. Upon determining that there is an abnormal failure in the registration procedure, the UE may start a timer T3511 upon the expiry of which the UE may reattempt the registration procedure by transmitting another REGISTRATION REQUEST message (including a TRACKING AREA UPDATE REQUEST) to the AMF. The AMF may, in turn, forward a context request (including the TRACKING AREA UPDATE REQUEST) to the MME. However, in scenario 200, as no UE information is available (since the MM context associated with the UE had been deleted), validation of the TRACKING AREA UPDATE REQUEST by the MME may result in failure. Thus, the MME sends a context response, with an indication of validation failure, to the AMF, which in turn sends a REGISTRATION REJECT message to the UE.

Figure 3:
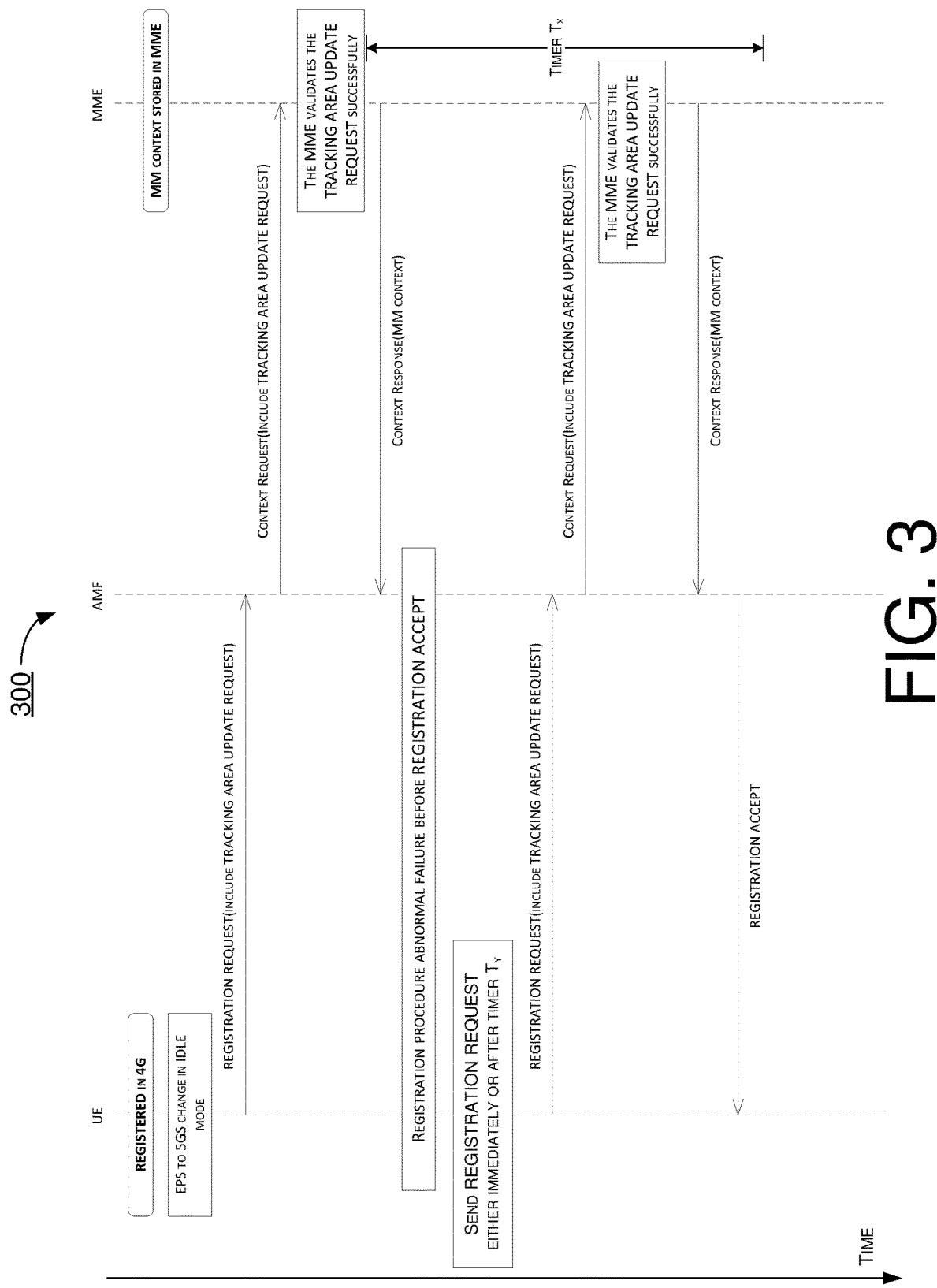
FIG. 3 is a flowchart of an example scenario in which various solutions and schemes in accordance with the present disclosure may be implemented.

For illustrative purposes only and without limiting the scope of the present disclosure, FIG. 3 illustrates an example scenario 300 in which various solutions and schemes in accordance with the present disclosure may be implemented. In scenario 300, initially, a UE (e.g., UE 110) may be registered in a 4G EPS and UE 110 may then change its connection from the 4G EPS to a 5GS. That is, UE 110 may be registered and in an idle mode when connected to the 4G EPS and then chooses to move to a 5GS cell while in the idle mode. Then, the UE may initiate a registration procedure by transmitting a REGISTRATION REQUEST message (including a TRACKING AREA UPDATE REQUEST) to an AMF of the wireless network (e.g., via network node 125). The AMF may, in turn, forward a context request (including the TRACKING AREA UPDATE REQUEST) to an MME of the wireless network. The MME may validate the TRACKING AREA UPDATE REQUEST successfully and, in response, send a context response (with an MM context) to the AMF. The MME may delete the MM context either immediately or upon expiry of a timer Tx (which may be started by the MME upon successful validation of the TRACKING AREA UPDATE REQUEST). On the other hand, an abnormal failure in the registration procedure may occur before the UE receives a REGISTRATION ACCEPT message from the AMF. Upon determining that there is an abnormal failure in the registration procedure, the UE may reattempt the registration procedure either: (i) immediately (e.g., without delay) upon determining or detecting the abnormal failure, or (ii) upon expiry of a timer Ty which has a duration shorter than that of timer Tx. That is, the UE may reattempt the registration procedure by transmitting another REGISTRATION REQUEST message (including a TRACKING AREA UPDATE REQUEST) to the AMF. The AMF may, in turn, forward a context request (including the TRACKING AREA UPDATE REQUEST) to the MME. In scenario 300, as the UE reattempts the registration procedure before timer Tx at the MME expires, validation of the TRACKING AREA UPDATE REQUEST by the MME results in success. Thus, the MME sends a context response, with an MM context, to the AMF, which in turn sends a REGISTRATION ACCEPT message to the UE to complete the registration procedure.

Illustrative Implementations

Figure 4:
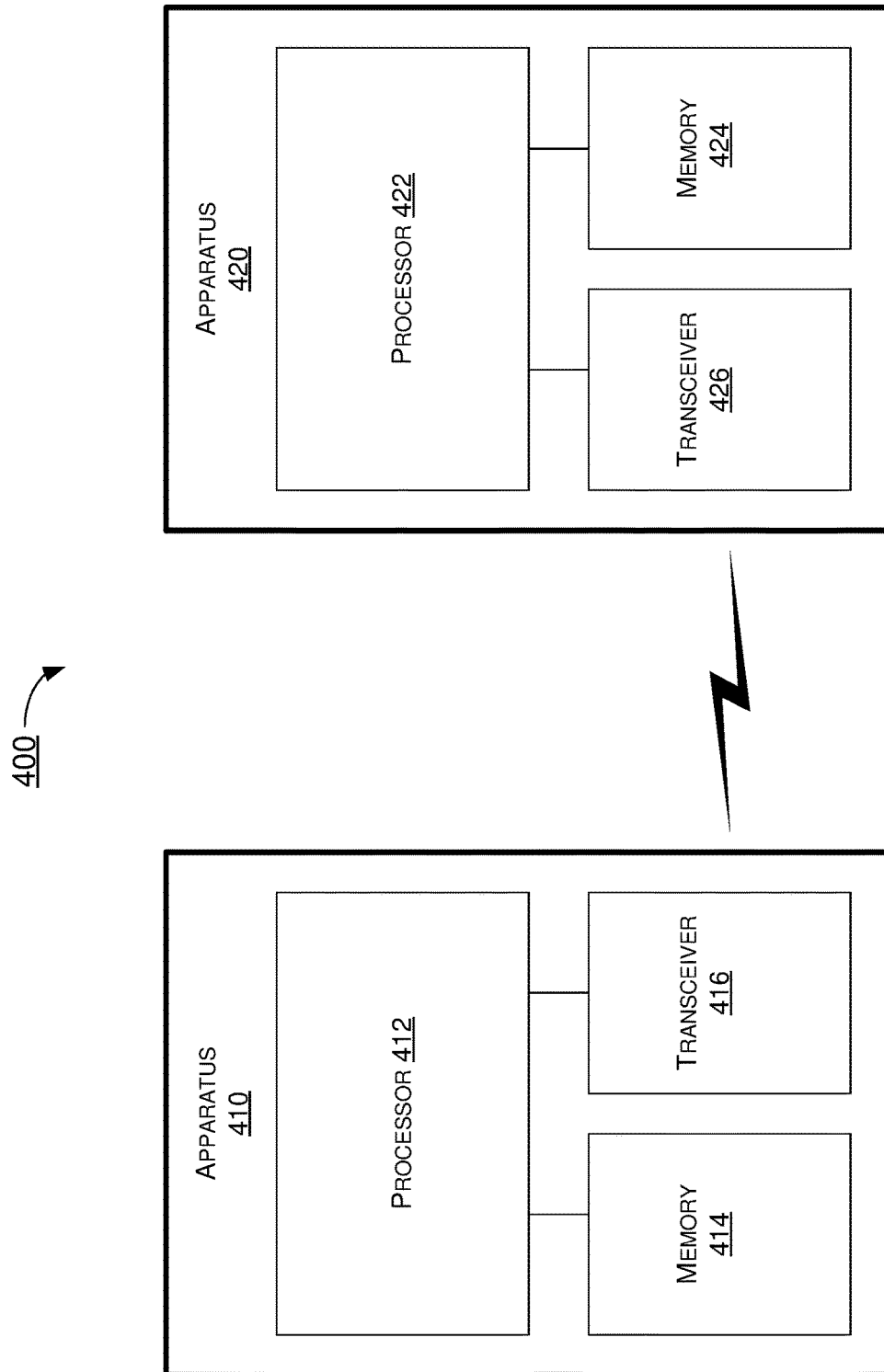
FIG. 4 is a block diagram of an example communication system in accordance with an implementation of the present disclosure.

FIG. 4 illustrates an example communication system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to an improvement on the inter-system registration failure case in mobile communications, including the various schemes described above with respect to various proposed designs, concepts, schemes, systems and methods described above, including network environment 100, as well as processes described below.

Each of apparatus 410 and apparatus 420 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 410 and apparatus 420 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to an improvement on the inter-system registration failure case in mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory. Alternatively, or additionally, each of memory 414 and memory 424 may include a UICC.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 125) of a wireless network (e.g., wireless network 120), is provided below.

Under various proposed schemes in accordance with the present disclosure with respect to an improvement on the inter-system registration failure case in mobile communications, processor 412 of apparatus 410, implemented in or as UE 110, may, when in an idle mode, perform, via transceiver 416, a registration procedure with a wireless network (e.g., wireless network 120 via apparatus 420 as network node 125) after an inter-system change (e.g., between 5GS and EPS). Additionally, processor 412 may detect, via transceiver 416, a failure of the registration procedure. Moreover, in response to the detecting, processor 412 may reattempt, via transceiver 416, the registration procedure either: (i) after detecting the failure; or (ii) upon expiry of a first timer used by the UE which has a shorter duration than a second timer used by the UE.

In some implementations, in reattempting the registration procedure, processor 412 may restart the registration procedure without delay after detecting the failure.

In some implementations, in reattempting the registration procedure, processor 412 may restart the registration procedure without delay upon release of an NRRC connection after detecting the failure.

In some implementations, in reattempting the registration procedure, processor 412 may perform certain operations. For instance, processor 412 may set a shorter duration for a T3511 timer, as the first timer, to be shorter than a duration of a normal T3511 timer, as the second timer. Moreover, processor 412 may transmit a registration request to the wireless network upon expiry of the T3511 timer with the shorter duration.

Alternatively, or additionally, in reattempting the registration procedure, processor 412 may perform certain operations. For instance, processor 412 may start a new timer, as the first timer, having a duration shorter than that of a T3511 timer, as the second timer. Additionally, processor 412 may transmit a registration request to the wireless network upon expiry of the new timer.

Alternatively, or additionally, in reattempting the registration procedure, processor 412 may perform certain other operations. For instance, processor 412 may start a new timer, as the first timer, upon release of an NRRC connection after detecting the failure, the new timer having a duration shorter than that of a T3511 timer, as the second timer. Furthermore, processor 412 may transmit a registration request to the wireless network upon expiry of the new timer.

In some implementations, in performing the registration procedure with the wireless network after the inter-system change, processor 412 may perform a 5GMM registration procedure when in the idle mode after changing from an EPS to a 5GS.

In some implementations, in performing the registration procedure with the wireless network, processor 412 may transmit a registration request with an integrity-protected TAU request to the wireless network.

In some implementations, the failure may include an abnormal failure that occurs despite the wireless network validates the TAU request successfully. In some implementations, the failure may include an abnormal failure that occurs before receiving a registration accept message from the wireless network.

Illustrative Processes

FIG. 5 illustrates an example process 500 in accordance with an implementation of the present disclosure. Process 500 may represent an aspect of implementing various proposed designs, concepts, schemes, systems and methods described above, whether partially or entirely, including those described above. More specifically, process 500 may represent an aspect of the proposed concepts and schemes pertaining to an improvement on the inter-system registration failure case in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., network node 125) of a wireless network (e.g., wireless network 120). Process 500 may begin at block 510.

At 510, process 500 may involve processor 412 of apparatus 410, implemented in or as UE 110, performing, when in an idle mode and via transceiver 416, a registration procedure with a wireless network (e.g., wireless network 120 via apparatus 420 as network node 125) after an inter-system change (e.g., between 5GS and EPS). Process 500 may proceed from 510 to 520.

At 520, process 500 may involve processor 412 detecting, via transceiver 416, a failure of the registration procedure. Process 500 may proceed from 520 to 530.

At 530, in response to the detecting, process 500 may involve processor 412 reattempting, via transceiver 416, the registration procedure either: (i) after detecting the failure; or (ii) upon expiry of a first timer used by the UE which has a shorter duration than a second timer used by the UE.

In some implementations, in reattempting the registration procedure, process 500 may involve processor 412 restarting the registration procedure without delay after detecting the failure.

In some implementations, in reattempting the registration procedure, process 500 may involve processor 412 restarting the registration procedure without delay upon release of an NRRC connection after detecting the failure.

In some implementations, in reattempting the registration procedure, process 500 may involve processor 412 performing certain operations. For instance, process 500 may involve processor 412 setting a shorter duration for a T3511 timer, as the first timer, to be shorter than a duration of a normal T3511 timer, as the second timer. Moreover, process 500 may involve processor 412 transmitting a registration request to the wireless network upon expiry of the T3511 timer with the shorter duration.

Alternatively, or additionally, in reattempting the registration procedure, process 500 may involve processor 412 performing certain operations. For instance, process 500 may involve processor 412 starting a new timer, as the first timer, having a duration shorter than that of a T3511 timer, as the second timer. Additionally, process 500 may involve processor 412 transmitting a registration request to the wireless network upon expiry of the new timer.

Alternatively, or additionally, in reattempting the registration procedure, process 500 may involve processor 412 performing certain operations. For instance, process 500 may involve processor 412 starting a new timer, as the first timer, upon release of an NRRC connection after detecting the failure, the new timer having a duration shorter than that of a T3511 timer, as the second timer. Furthermore, process 500 may involve processor 412 transmitting a registration request to the wireless network upon expiry of the new timer.

In some implementations, in performing the registration procedure with the wireless network after the inter-system change, process 500 may involve processor 412 performing a 5GMM registration procedure when in the idle mode after changing from an EPS to a 5GS.

In some implementations, in performing the registration procedure with the wireless network, process 500 may involve processor 412 transmitting a registration request with an integrity-protected TAU request to the wireless network.

In some implementations, the failure may include an abnormal failure that occurs despite the wireless network validates the TAU request successfully. In some implementations, the failure may include an abnormal failure that occurs before receiving a registration accept message from the wireless network.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing, by a processor of a user equipment (UE), a registration procedure with a wireless network after an inter-system change;
detecting, by the processor, a failure of the registration procedure; and
responsive to the detecting, reattempting, by the processor, the registration procedure upon expiry of a first timer used by the UE which has a shorter duration than a second timer used by the UE,
wherein the reattempting of the registration procedure comprises:
setting a shorter duration for a T3511 timer, as the first timer, to be shorter than a duration of a normal T3511 timer, as the second timer; and
transmitting a registration request to the wireless network upon expiry of the T3511 timer with the shorter duration.

2. The method of claim 1, wherein the performing of the registration procedure with the wireless network after the inter-system change comprises performing a 5$^{th}$ Generation Mobility Management (5GMM) registration procedure after changing from an Evolved Packet System (EPS) to a 5$^{th}$ Generation System (5GS).

3. The method of claim 1, wherein the performing of the registration procedure with the wireless network comprises transmitting a registration request with an integrity-protected tracking area update (TAU) request to the wireless network.

4. The method of claim 3, wherein the failure comprises an abnormal failure that occurs despite the wireless network validates the TAU request successfully.

5. The method of claim 1, wherein the failure comprises an abnormal failure that occurs before receiving a registration accept message from the wireless network.

6. An apparatus implementable in a user equipment (UE), comprising:
a transceiver configured to communicate with a wireless network; and
a processor coupled to the transceiver and configured to perform operations comprising:
performing, via the transceiver, a registration procedure with the wireless network after an inter-system change;
detecting, via the transceiver, a failure of the registration procedure; and
responsive to the detecting, reattempting, via the transceiver, the registration procedure upon expiry of a first timer used by the UE which has a shorter duration than a second timer used by the UE,
wherein the reattempting of the registration procedure comprises:
setting a shorter duration for a T3511 timer, as the first timer, to be shorter than a duration of a normal T3511 timer, as the second timer; and
transmitting a registration request to the wireless network upon expiry of the T3511 timer with the shorter duration.

7. The apparatus of claim 6, wherein the performing of the registration procedure with the wireless network after the inter-system change comprises performing a 5$^{th}$ Generation Mobility Management (5GMM) registration procedure after changing from an Evolved Packet System (EPS) to a 5$^{th}$ Generation System (5GS).

8. The apparatus of claim 6, wherein the performing of the registration procedure with the wireless network comprises transmitting a registration request with an integrity-protected tracking area update (TAU) request to the wireless network.

9. The apparatus of claim 8, wherein the failure comprises an abnormal failure that occurs despite the wireless network validates the TAU request successfully.

10. The apparatus of claim 6, wherein the failure comprises an abnormal failure that occurs before receiving a registration accept message from the wireless network.

* * * * *